C. D. McCOURT.
METAL MELTING FURNACE.
APPLICATION FILED JAN. 4, 1912.
1,046,828.
Patented Dec. 10, 1912.
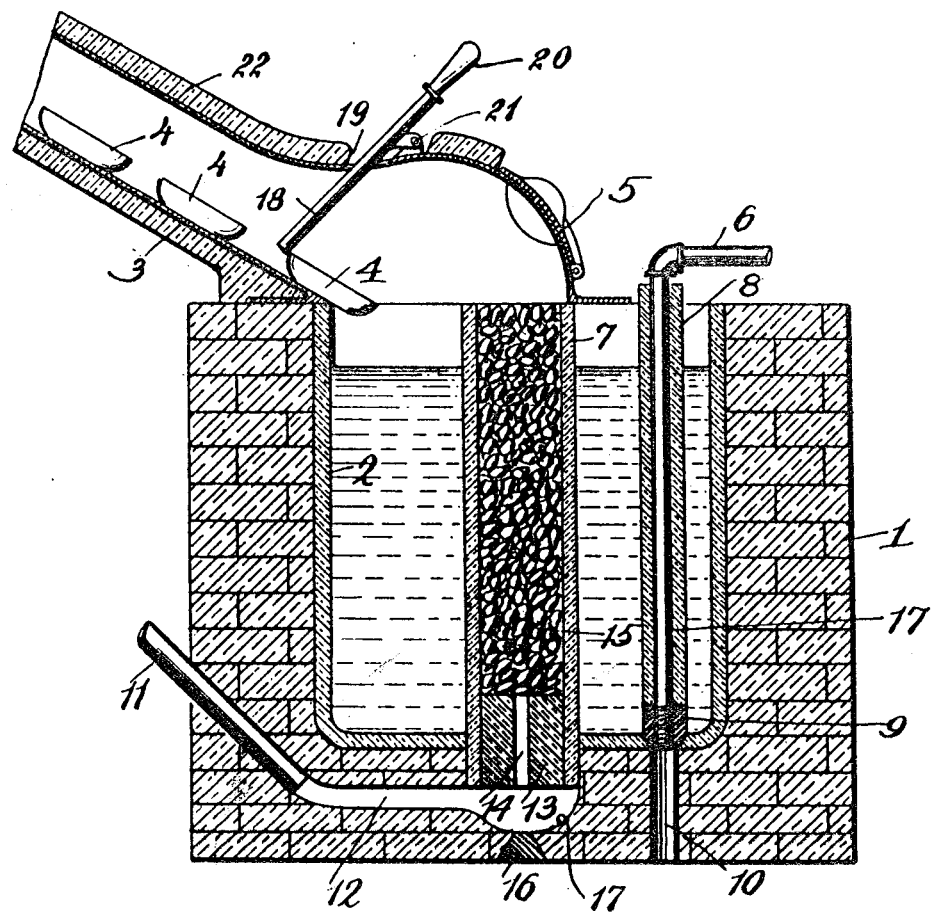

UNITED STATES PATENT OFFICE.

CYRIL DOUGLAS McCOURT, OF STREATHAM COMMON, LONDON, ENGLAND, ASSIGNOR TO RADIANT HEATING LIMITED, OF LEEDS, ENGLAND, A BRITISH CORPORATION.

METAL-MELTING FURNACE.

1,046,828.  Specification of Letters Patent.  Patented Dec. 10, 1912.

Application filed January 4, 1912. Serial No. 669,418.

*To all whom it may concern:*

Be it known that I, CYRIL DOUGLAS MCCOURT, a subject of the King of Great Britain, and resident of 45 Braxted Park, Streatham Common, London, S. W., England, have made a certain new and useful Invention Relating to Metal-Melting Furnaces, of which the following is a specification, taken in connection with the accompanying drawing, which forms part of the same.

This invention relates especially to furnaces for melting metals or other material and may comprise a suitable melting chamber having the desired number of heating tubes mounted therein so as to be surrounded by the charge of metal or the like and supply heat thereto, each of these tubes containing granular refractory combustion accelerating material and having an explosive gaseous mixture injected thereinto so as to cause its accelerated combustion within the granular material as more fully described in the United States patent to Bone, Wilson and McCourt, No. 1,015,261, granted January 16, 1912, which broadly covers such tubular heating units for heating liquids, melting metals, and so forth. By arranging such heating tubes in substantially vertical position within the melting chamber the heat from the accelerated combustion of the gaseous mixture is transmitted outward through the tubes into the surrounding charge and the hot combustion gases passing upward through additional granular material supply further heat thereto which may be similarly transmitted outward to the charge while the hot discharged gases may be used to preheat the material being fed into the melting chamber while such material is passing down a suitable charging chute through which the discharge gases pass.

In the accompanying drawing showing in a somewhat diagrammatic way a vertical section through an illustrative form of this invention, the melting chamber may be provided with a suitable lining 2 of material sufficiently refractory to withstand the working temperature of the furnace and preferably having little or no fluxing or other undesirable action in connection with the charge.

For the melting of copper, brass, aluminum, etc., the chamber lining may be formed of fireclay or the like, while for more infusible charges a still more refractory lining is desirable, such as plumbago, alumina or magnesia compositions in the case of cast iron, steel, and so forth, which may be efficiently melted under some conditions. The series of heating tubes may be mounted in any desired way so as to traverse the melting chamber and are preferably mounted in a substantially vertical position so as to be surrounded by the charge in the melting chamber and efficiently transmit heat thereto. The heating tubes or separating or inclosing shells 7 which may be of any desired shape and size may for good results be given a cylindrical form and an internal diameter of three or four inches or more and a sufficient number mounted within the chamber to give the desired heating effect. For high temperature work these tubes or inclosing shells 7 may be formed of graphite, alumina or magnesia compositions, although for charges which melt at low temperatures metallic tubes or shells may be used, iron tubes proving highly desirable for readily fusible metal, such as tin, lead, type metal, etc., in which case the chamber lining may of course be of metal if desired.

The chamber lining should of course be surrounded with suitable non-conducting material to minimize radiation losses and for high temperature work this casing may be in the form of a firebrick furnace wall 1 of the desired thickness which serves to support the chamber. The tubes are each preferably provided adjacent their lower ends with a suitable plug 13 which may be formed of refractory material and formed with one or more injecting passages 14. The interior of the tube beyond the plug may be packed with granular combustion accelerating material of sufficient refractoriness to withstand the high temperatures developed and preferably of substantially uniform size, such as between about one-half and one inch mesh for a small sized tube. Substantially uniform sized calcined magnesite has proved a highly desirable combustion accelerating material for high temperature work and porous coarsely crushed firebrick is suitable for lower temperatures.

The explosive gaseous mixture may be formed by mixing air and combustible gas in the desired proportions and bringing the mixture into contact with the combustion accelerating material in any desired way. This may be effected by forcing a previously formed explosive mixture of air and coal gas, producer gas or other combustible gas or vapor through a supply pipe 11 communicating with a supply passage 12 leading to each one of the heating tubes. The gaseous mixture may be supplied under a pressure of four to sixteen ounces more or less in order to overcome the resistance of the granular material in the heating tubes and to inject the mixture through the injecting passages at such speed as to substantially prevent backfiring under normal operating conditions and effect the highly accelerated combustion of the explosive gaseous mixture within the granular combustion accelerating material.

For high temperature work it is desirable to form the supply passage with a suitable collecting chamber, such as 17, adjacent the lower end of each heating tube communicating therewith, so that in case of erosion or cracking of any of the tubes so as to admit the molten charge of metal or the like thereto, the metal will enter this collecting chamber and be discharged therefrom by any suitable automatically releasable plug or device, such, for instance, as the fusible discharge plug 16 which may be located as shown in the drawings at the bottom of this collecting chamber. In this way the charge in the melting chamber may be withdrawn in case of accident, this emergency discharge calling attention to the failure of the heating tubes or connections so that the regular tapping hole may be opened and the charge also removed in that way. A suitable tapping arrangement for high temperature work may comprise a tapping hole 10 normally closed by a refractory tapping valve 9 mounted on a suitable stem 17 which is preferably given a tubular form so that a cooling current of air or the like may be supplied thereto through the cooling air pipe 6 so as to cool the stem and valve and be discharged through the tapping hole 10 if desired when the valve is closed. This valve stem may of course be protected by a suitable refractory sleeve, such as 8.

The melting chamber may have its top substantially covered with a suitable hood communicating with the exhaust flue 3 and this hood may be covered to the desired extent with a suitable non-conducting casing or lagging 22 to minimize radiation of heat therefrom. It is also desirable to provide a suitable charging chute having any desired inclination preferably ample to insure the feed of the charged material down the same so that the charged material may be heated before entering the melting chamber by the hot discharged gases from the heating tubes. An inclined charging chute 3 may be used having sufficient slope so that the ingots 4 tend to slide down the same into the melting chamber. A suitable control device is preferably used in connection with this chute so as to control the feed of the charged material to the chamber and this may take the form of the control lever 18 which may be pivoted about the pivot 21 in the hood and have its lower end projecting through the slot 19 and extending in the form of one or more bars or members into the path of the ingots so as to retard their movement to the desired extent, the handle 20 allowing this control device to be operated so as to feed the ingots into the melting chamber from time to time. Or in some cases where the heat is sufficient and the control device is located sufficiently close to the melting chamber the ingots may melt sufficiently to flow down the chute past the discharge device which may be allowed to remain stationary under such conditions and such an arrangement in which the control device may be in the form of one or more stationary bars at the bottom of a more steeply inclined charging chute, if desired, may be used in connection with melting furnaces of this character for lead, type metal and similar readily fusible material.

The furnace may be started by separately lighting each one of the heating tubes which may be effected by opening the corresponding igniting door 5 in the hood and igniting the gaseous mixture at the top of the tube, so that it flashes back through the granular material. In this way the granular material adjacent the injecting passages becomes heated sufficiently to effect the highly accelerated surface combustion of the explosive gaseous mixture fed thereto and cause the combustion of the fuel within the granular material to take place with high radiant efficiency and the development of unusually high temperatures which with some gaseous mixtures may be as much as 2000° centigrade even without preheating or high compression of the gases. In this way high melting temperatures are available when required and correspondingly higher efficiencies are secured in melting more fusible material. The heat is rapidly transmitted by radiation from the incandescent refractory material so as to be transmitted through the tubes or inclosing shells to the surrounding body of molten material which is of course a much more efficient method of heating than by external flame. Under the most efficient operating conditions the combustion of the fuel is practically completed in the lower part of the tube so that the granular material beyond is heated by the hot combustion gases which are thereby considerably cooled before being discharged from the tube and the efficiency is thereby increased. The discharge gases from the heating tubes may thus have temperatures approaching that of the molten charge and the flue gas temperatures may be considerably reduced and a corresponding saving in the fuel effected by using them in the manner described to preheat the charged material before it is fed into the melting chamber.

Having described this invention in connection with a number of illustrative forms, proportions, materials and arrangements of parts, to the details of which disclosure the invention is not to be limited, what is claimed as new and what is desired to be secured by Letters Patent is set forth in the appended claims.

1. In melting furnaces, a melting chamber having refractory lining, a series of substantially vertically arranged heating tubes mounted within said melting chamber, said tubes being formed of highly refractory heat conducting material and being provided adjacent their lower ends with refractory plugs formed with injecting passages, granular refractory combustion accelerating material of between about one-half and one inch mesh packed within said tubes, means to force through said injecting passages at a speed greater than the speed of backfiring an explosive gaseous mixture to cause the highly accelerated surface combustion thereof within said granular material, said means comprising a supply pipe and supply passage communicating with each heating tube, a collecting chamber provided with an automatically releasable fusible plug communicating with each heating tube to allow the molten material entering said collecting chamber to be discharged therefrom, a hood substantially inclosing the top of said melting chamber, an igniting door in said hood to give access to said heating tubes, an exhaust flue communicating with said hood, a charging chute down which the charged material tends to feed into said melting chamber and be simultaneously heated by the hot discharge gases from said tubes and a pivoted control device coöperating with said charging chute to control the feed of the charged material therethrough.

2. In melting furnaces a melting chamber having refractory lining, a series of substantially vertically arranged heating tubes mounted within said melting chamber, said tubes being formed of refractory heat conducting material and being provided adjacent their lower ends with refractory plugs formed with injecting passages, granular refractory combustion accelerating material within said tubes, means to force through said injecting passages at a speed greater than the speed of backfiring an explosive gaseous mixture to cause the highly accelerated surface combustion thereof within said granular material, a collecting chamber provided with an automatically releasable fusible plug communicating with each heating tube to allow the molten material entering said collecting chamber to be discharged therefrom, a hood substantially inclosing the top of said melting chamber, an igniting door in said hood to give access to said heating tubes, an exhaust flue communicating with said hood, a charging chute down which the charged material tends to feed into said melting chamber and be simultaneously heated by the hot discharge gases from said tubes and a pivoted control device coöperating with said charging chute to control the feed of the charged material therethrough.

3. In melting furnaces, a melting chamber, a series of substantially vertically arranged heating tubes mounted within said melting chamber, said tubes being formed of refractory heat conducting material and being provided adjacent their lower ends with refractory plugs formed with injecting passages, granular refractory combustion accelerating material within said tubes, means to force through said injecting passages at a speed greater than the speed of backfiring an explosive gaseous mixture to cause the highly accelerated surface combustion thereof within said granular material, a collecting chamber provided with an automatically releasable plug communicating with each heating tube to allow the molten material entering said collecting chamber to be discharged therefrom, a hood substantially inclosing the top of said melting chamber, an igniting door in said hood to give access to said heating tubes, an exhaust flue communicating with said hood, a charging chute down which the charged material tends to feed into said melting chamber and be simultaneously heated by the hot discharge gases from said tubes and a control device coöperating with said charging chute to control the feed of the charged material therethrough.

4. In melting furnaces, a melting chamber, a series of heating tubes mounted within said melting chamber, said tubes being formed of refractory heat conducting material and being provided adjacent their lower ends with refractory plugs formed with injecting passages, granular refractory combustion accelerating material within said tubes, means to force through said injecting passages at a speed greater than the speed of backfiring an explosive gaseous mixture to cause the highly accelerated surface combustion thereof within said granular material, a collecting chamber provided with an automatically releasable plug communicating with each heating tube to allow the molten material entering said collecting chamber to be discharged therefrom, a hood substantially inclosing the top of said melting chamber, an exhaust flue communicating with said hood, a charging chute down which the charged material tends to feed into said melting chamber and be simultaneously heated by the hot discharge gases from said tubes and a control device coöperating with said charging chute to control the feed of the charged material therethrough.

5. In furnaces for molten material, a melting chamber, a substantially vertically arranged heating tube mounted within said melting chamber, said tube being formed of heat conducting material and being provided adjacent its lower end with a refractory plug formed with an injecting passage, granular refractory combustion accelerating material of between about one-half and one inch mesh within said tube, means to force into contact with said granular material at a speed greater than the speed of backfiring an explosive gaseous mixture to cause the accelerated surface combustion thereof within said heated granular material, a collecting chamber provided with an automatically releasable plug communicating with said heating tube to allow the molten material entering said collecting chamber to be discharged therefrom, a hood substantially inclosing the top of said melting chamber, an exhaust flue communicating with said hood, a charging chute down which the charged material tends to feed into said melting chamber and be simultaneously heated by the hot discharge gases from said tube and a control device coöperating with said charging chute to control the feed of the charged material therethrough.

6. In furnaces for molten material a melting chamber, a heating tube mounted within said melting chamber, said tube being formed of heat conducting material, granular refractory combustion accelerating material within said tube, means to force into contact with said granular material at a speed greater than the speed of backfiring an explosive gaseous mixture to cause the accelerated surface combustion thereof within said heated granular material, a collecting chamber provided with an automatically releasable plug communicating with said heating tube to allow the molten material entering said collecting chamber to be discharged therefrom, a hood substantially inclosing the top of said melting chamber, a charging chute down which the charged material tends to feed into said melting chamber and be simultaneously heated by the hot discharge gases from said tube and a control device coöperating with said charging chute to control the feed of the charged material therethrough.

7. In furnaces for molten material a melting chamber, a heating tube mounted within said melting chamber, said tube being formed of heat conducting material, granular refractory combustion accelerating material within said tube, means to force into contact with said granular material at a speed greater than the speed of backfiring an explosive gaseous mixture to cause the accelerated surface combustion thereof within said heated granular material, and a collecting chamber provided with an automatically releasable plug communicating with said heating tube to allow the molten material entering said collecting chamber to be discharged therefrom.

8. In furnaces for molten material a melting chamber, a heating tube mounted within said melting chamber, said tube being formed of heat conducting material, granular refractory combustion accelerating material within said tube, means to force into contact with said granular material at a speed greater than the speed of backfiring an explosive gaseous mixture to cause the accelerated surface combustion thereof within said heated granular material, a hood substantially inclosing the top of said melting chamber, a charging chute down which the charged material tends to feed into said melting chamber and be simultaneously heated by the hot discharge gases from said tube and a control device coöperating with said charging chute to control the feed of the charged material therethrough.

9. In furnaces for molten material a melting chamber, a heating tube mounted within said melting chamber, said tube being formed of heat conducting material, granular refractory combustion accelerating material within said tube, means to force into contact with said granular material at a speed greater than the speed of backfiring an explosive gaseous mixture to cause the accelerated surface combustion thereof within said heated granular material, and a charging chute down which the charged material tends to feed into said melting chamber and be simultaneously heated by the hot discharge gases from said tube.

10. In furnaces for molten material or the like, a furnace chamber, a substantially vertically arranged heating unit mounted within said furnace chamber to come in contact with and supply heat to the charge therein, said heating unit being formed with a heat conducting inclosing shell, granular refractory combustion accelerating material within said shell, means to form and feed into contact with said granular material an explosive gaseous mixture to cause accelerated surface combustion thereof within said refractory material, a hood substantially inclosing the top of said melting chamber, an igniting opening in said hood, an exhaust flue communicating with said hood and a charging chute down which the charged material tends to feed into said melting chamber and be simultaneously heated by the hot discharge gases from said unit.

11. In furnaces for molten material or the like, a furnace chamber, a substantially vertically arranged heating unit mounted within said furnace chamber to come in contact with and supply heat to the charge therein, said heating unit being formed with a heat conducting inclosing shell, granular refractory combustion accelerating material within said shell, means to form and feed into contact with said granular material an explosive gaseous mixture to cause accelerated surface combustion thereof within portions of said refractory material and means to pass the hot gases of said combustion through additional refractory material in said shell and absorb heat from said gases.

12. In furnaces for molten material or the like, a furnace chamber, a heating unit mounted within said furnace chamber to come in contact with and supply heat to the charge therein, said heating unit being formed with a heat conducting inclosing shell, refractory combustion accelerating material within said shell, means to form and feed into contact with said granular material an explosive gaseous mixture to cause accelerated surface combustion thereof within the first portions of said refractory material and means to pass the hot gases of said combustion through additional refractory material in said shell and absorb heat from said gases.

13. In furnaces for molten material or the like, a furnace chamber, a heating unit in said furnace chamber to be surrounded by the charge, said heating unit being formed with a heat conducting shell, granular refractory combustion accelerating material within said shell, means to form an explosive mixture of combustible gas and of supporter of combustion therefor in substantially the proportions required for complete combustion and feed the same into contact with said refractory combustion accelerating material to effect the accelerated combustion of said explosive gaseous mixture within said refractory material and transmit heat through said shell into the surrounding charge, a charging chute communicating with said furnace chamber and means to heat charged material in said chute by the hot gases discharged from said heating unit.

14. In furnaces for molten material or the like, a furnace chamber, a heating unit in said furnace chamber to be surrounded by the charge, said heating unit being formed with a heat conducting shell, refractory combustion accelerating material within said shell and means to form an explosive mixture of combustible gas and of supporter of combustion therefor in substantially the proportions required for complete combustion and feed the same into contact with said refractory combustion accelerating material to effect the accelerated combustion of said explosive gaseous mixture within said refractory material and transmit heat through said shell into the surrounding charge.

15. In furnaces for heating molten metal or the like, a furnace chamber, a heating unit in said furnace chamber to be surrounded by the charge, said heating unit being formed with a heat-conducting shell, refractory combustion accelerating material within said shell, means to feed an explosive gaseous mixture of combustible and of supporter of combustion therefor into contact with said combustion accelerating material to effect accelerated combustion within portions of said refractory material and to transmit heat through said shell into the surrounding charge.

16. In melting furnaces, a melting chamber, a substantially vertically arranged heating tube in said melting chamber to be surrounded by the charge, said tube being formed of heat conducting material and having injecting passages adjacent one end, granular refractory combustion accelerating material within said tube, means to form an explosive mixture of combustible gas and of supporter of combustion therefor and feed the same into contact with said granular combustion accelerating material to effect the accelerated combustion of said explosive gaseous mixture within said granular material and transmit heat through said tube into the surrounding charge, a charging chute communicating with said melting chamber, means to heat charged material in said chute by the hot gases discharged from said heating tube, and means to control the feed of material through said chute into said melting chamber.

17. In melting furnaces, a melting chamber, a heating tube in said melting chamber to be surrounded by the charge, said tube being formed of heat conducting material, granular refractory combustion accelerating material within said tube, means to form an explosive mixture of combustible gas and of supporter of combustion therefor and feed the same into contact with said granular combustion accelerating material to effect the accelerated combustion of said explosive gaseous mixture within said granular material and transmit heat through said tube into the surrounding charge, a charging chute communicating with said melting chamber, means to heat charged material in said chute by the hot gases discharged from said heating tube and means to control the feed of material through said chute into said melting chamber.

18. In melting furnaces, a melting chamber, a heating tube in said melting chamber to be surrounded by the charge, said tube being formed of heat conducting material, granular refractory combustion accelerating material within said tube, means to form an explosive mixture of combustible gas and of supporter of combustion therefor and feed the same into contact with said granular combustion accelerating material to effect the accelerated combustion of said explosive gaseous mixture within said granular material and transmit heat through said tube into the surrounding charge.

19. In furnaces for heating molten material or the like, a furnace chamber, a heating unit in said furnace chamber to be surrounded by the charge, said heating unit being formed with a substantially vertical metallic shell within the furnace chamber, refractory combustion accelerating material within said shell, means to feed an explosive gaseous mixture of combustible and of supporter of combustion therefor into contact with said combustion accelerating material to effect accelerated combustion within portions of said refractory material and to pass the hot gases of said combustion through additional portions of said refractory material and to transmit heat through said shell into the surrounding charge and means to heat charged material by the hot gases discharged from said heating unit.

20. In furnaces for heating molten material or the like, a furnace chamber, a heating unit in said furnace chamber to be surrounded by the charge, said heating unit being formed with a tubular shell, refractory combustion accelerating material within said shell, means to feed an explosive gaseous mixture of combustible and of supporter of combustion therefor into contact with said combustion accelerating material to effect accelerated combustion of said combustible within portions of said refractory material and to transmit heat through said shell into the surrounding charge.

CYRIL DOUGLAS McCOURT.

Witnesses:
HARRY L. DUNCAN,
JESSIE B. KAY.

Copies of this patent may be obtained for five cents each, by addressing the "Commissioner of Patents, Washington, D. C."